UNITED STATES PATENT OFFICE.

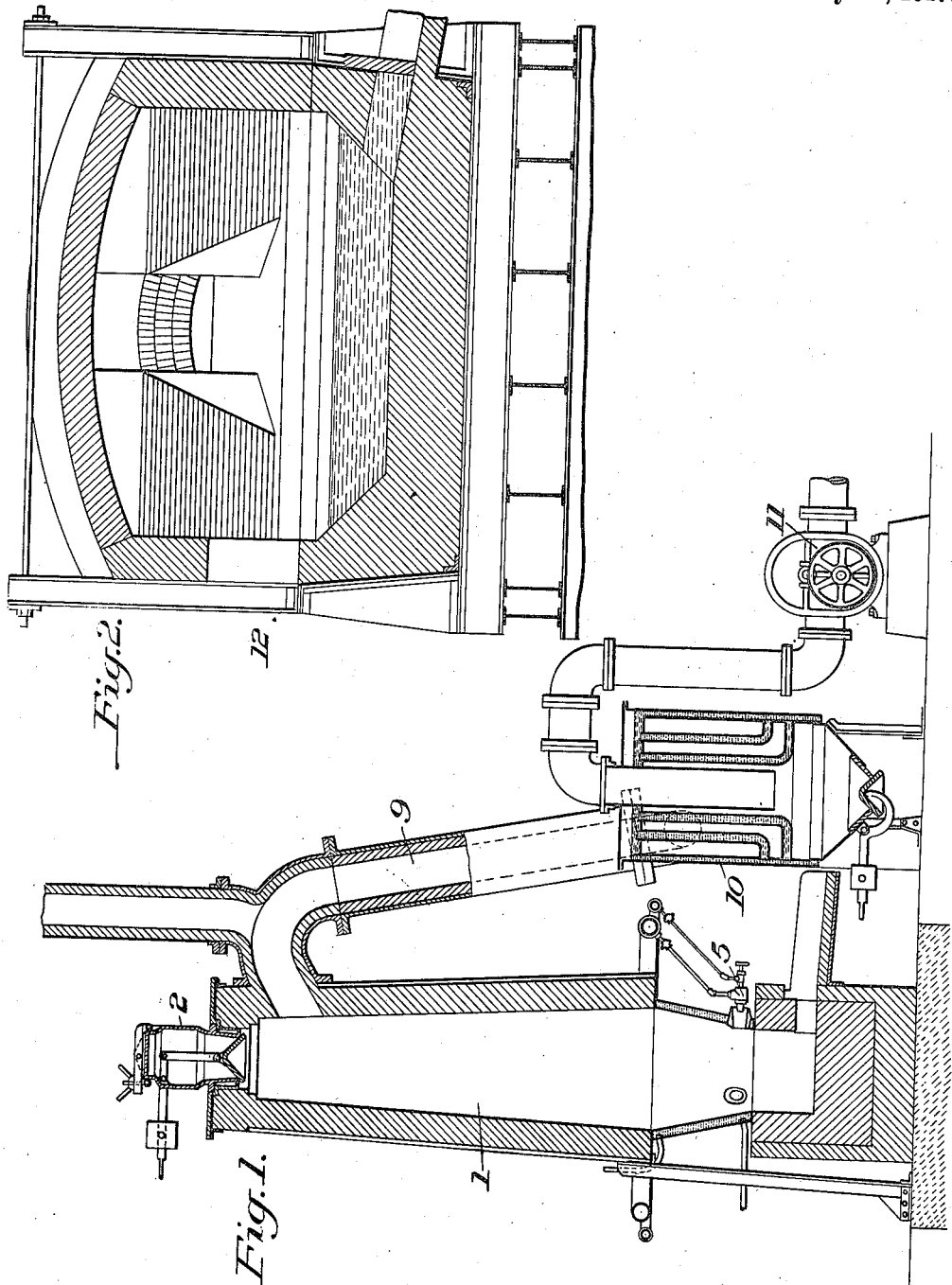

GEORGE L. FOGLER, OF PITTSBURGH, PENNSYLVANIA.

PROCESS OF REDUCING METAL-BEARING SUBSTANCES.

1,227,127.  Specification of Letters Patent.  Patented May 22, 1917.

Application filed March 30, 1912. Serial No. 687,345.

*To all whom it may concern:*

Be it known that I, GEORGE L. FOGLER, a resident of Pittsburgh, in the county of Allegheny and State of Pennsylvania, have invented a new and useful Improvement in Processes of Reducing Metal-Bearing Substances, of which the following is a specification.

This invention relates to a process of reducing iron or other metals from their ores or from scrap, or refining such metals after they have already been reduced. The object of the invention is to produce metal of unusual fineness from any grade of ore, scrap, or other metal bearing substance, entirely irrespective of how rich or poor the metal bearing substance is, or what or how many impurities it may contain, and to effect this result economically.

This process is adapted for reducing or refining various metals, and is especially adapted for reducing iron from its ore, scrap or other iron bearing substance, for the manufacture of either wrought iron or steel, and the description of the method hereinafter contained has special reference to the manufacture of steel.

It is well known to those familiar with the manufacture of steel that the physical properties of a metal are improved if oxygen and nitrogen are excluded during the smelting process, even if the analysis of the metal is otherwise unchanged, and that said properties are also governed materially by the carbon content of the metal. The present process effects in a simple manner and at a low cost the reduction of the metal without the presence of and away from contact with oxygen and nitrogen and in a manner to control the carbon content, a result heretofore obtained only in the electric furnace at great expense.

The process, generally stated, consists in dissolving the ore, scrap or other metal bearing substances in a bath of slag that partially reduces the metal, and then fully reducing and precipitating the metal in a pure state from the bath. The slag absorbs and retains most of the impurities in the ore or other metal bearing substance and also forms a cover or envelop and protects the metal from the action of the oxygen and nitrogen which may be passing through the furnace.

The process may be carried out in a single furnace, in which event it will be intermittent or in batches. In order to carry the process out on a commercial scale and substantially continuously, two furnaces are preferably used, the first being substantially a stack or blast furnace, and the second, in all substantial particulars, an open hearth furnace of well known type.

In the accompanying drawing, Figure 1 is a view partly in elevation and partly in section showing a stack furnace suitable for carrying out the process in its entirety, but preferably employed merely to reduce the ore or other metal bearing substance to a sponge; Fig. 2 is a vertical sectional view of an ordinary open hearth furnace for precipitating the metal from the sponge.

In carrying out the process, the metal bearing substance is preferably heated together with a chemical compound of aluminum or magnesium, such as bauxite, feldspar, kaolin or similar material, together with a small quantity of carbon, such as coke, charcoal, or graphite, insufficient to complete the reduction of the metal, and with limestone, silica or other flux as the nature of the charge may require. It is necessary to bring the temperature of this charge up to a bright red heat, at which temperature partial reduction occurs. The aluminum or magnesium compounds increase the fluidity and probably also the temperature of the mass, so that fusion soon occurs, the partially reduced metal dissolving in the slag and forming a finely porous or spongy mass, free of carbon and through which the partially reduced metal is thoroughly disseminated. The metal is precipitated in the fully reduced condition when the temperature rises as the process continues.

When a single furnace is used the metal bearing substance, together with the proper portions of flux and carbon, may be placed in the furnace, which may be of any type, or even in a crucible or an open hearth. The carbon, if mixed with the mass, will be insufficient to fully reduce all of the metal in the container. Therefore, the crucible, furnace or other container, is preferably lined with carbon, in the same manner as the open hearth furnace used for the second operation when two furnaces are used, as hereinafter more fully described. The temperature is raised sufficiently to cause partial reduction of the metal bearing substance, fusion of the mass, and solution of the partially reduced metal in the slag and the production of a finely porous spongy mass. As solution and fusion go on the carbon lining of the container attacks the metal bearing substance and fully reduces the metal therein, which therefore coalesces and is precipitated in a molten condition from the mass. The crucible may then be poured or the furnace tapped and the metal drawn off in the usual manner.

For producing the metal for commercial purposes in large quantities, it is preferred to dissolve the metal bearing substance continuously in a stack furnace, very similar to an ordinary blast furnace for making cast iron, such as the furnace 1 shown in the accompanying drawing. The charge will contain the metal bearing substance and the necessary fluxes and only enough carbon to properly carry out the reactions between the various components of the charge and without completing reduction of the metal. The charge is introduced through a charging hopper 2, as is usual. The fuel for heating the charge to the point of ignition is supplied at the region of the twyers by means of a gas or oil burner 5, such as shown for instance in my application for Letters Patent filed March 13, 1912, Serial No. 683,510, or other equivalent. The waste gases from the furnace may be forced out under pressure introduced through the twyers, but I prefer to draw the same off by suction from the top of the furnace, as this facilitates liberation of the gases. As shown, the gases are drawn from the top of the furnace through downcomer 9, into the dust collector 10, by means of pump or fan 11.

After the furnace has been heated to the proper temperature the metal bearing substance is partially reduced and the mass begins to melt and runs down into the hearth of the furnace, forming a slag in which the partially reduced metal is dissolved, or held in suspension in a very finely divided state. As long as the slag continues to run into the hearth it remains in a molten state. If the supply of fresh charge be discontinued and the heat continued on the mass collected in the hearth, it will begin to boil and precipitate the metal, but only in case carbon is present on the hearth. It is preferred, however, to carry on a substantially continuous process and to add fresh charge from time to time to the furnace and without a carbon hearth, and consequently the molten mass is drawn off at convenient intervals from the hearth, and then taken immediately to the final reduction and precipitating furnace, or stored for future use. At this stage it is in the condition of sponge with the partially reduced metal in suspension in the slag.

The precipitating furnace 12 is practically the same as a basic open hearth furnace, such as universally used in the steel industries. The hearth is lined with basic material, but just prior to charging the sponge a predetermined amount of carbon in the form of graphite, coke or charcoal is worked over the bottom. The amount of carbon so charged depends upon the carbon content which it is desired the finished metal shall contain and can be regulated accurately and within narrow limits. As the temperature of this furnace is increased, the charge begins to swell and foam by the production of gases in fully reducing the metal by the carbon in the hearth. The reduced metal coalesces and is precipitated and collects upon the hearth. When the reaction is completed and all the metal has been precipitated, the slag settles down and rests upon the molten metal practically in the condition of a liquid glass. The metal is then drawn off in ladles and cast in the usual manner.

It is probable that reduction begins as soon as the charge begins to melt in the stack furnace, so that solution and reduction probably go on simultaneously. The metal at all times is protected by a coating of slag from the action of the oxygen and nitrogen. After the sponge is placed in the precipitating furnace there is no chance for oxygen and nitrogen to combine with the metal, as the latter is protected by the foaming slag during the early part of the precipitating process, and later on is covered with a thick layer of molten glass.

As the process consists in dissolving any metal bearing substance in a slag, and then precipitating a nearly chemically pure metal, and as the slag is formed of material of low cost, it is possible to recover small quantities of metal from slag, or other waste products containing too little metal to be profitably worked by present methods. In addition to extracting metals from their rich ores, the process is equally well adapted to refining metals by dissolving the impurities therein in the slag in the same manner as when reducing ores and precipitating the pure metal, leaving the impurities that were in the metal in the molten slag solution. I, therefore, do not want to limit myself to merely the reduction of ore, as I have used the process for recovery of small quantities of metal from waste products for the reduction of metals from their usual ores, and for refining metals already reduced but containing impurities.

What I claim is:

1. The process of reducing metal bearing substances consisting in heating the metal bearing substance with a flux and in the presence of carbon and thereby partially reducing the metal and dissolving it in molten slag and forming a carbon free mass with the partially reduced metal distributed therein, and heating said mass in a carbon surface container and thereby fully reducing the metal and causing it to coalesce and precipitate in the fused condition from the slag.

2. The process of reducing metal bearing substances, consisting in partially reducing the metal bearing substance in the presence of carbon and dissolving the partially reduced product in molten slag, thereby forming a spongy mass, and heating the spongy mass in a carbon lined container and thereby fully reducing it and causing the free metal to coalesce and precipitate in the fused condition from the slag.

3. The process of reducing iron from its ores or other iron bearing substances, consisting in partially reducing the iron bearing substance in one furnace in the presence of carbon and in said furnace dissolving the partially reduced substance in molten slag, thereby forming a spongy mass, and heating the spongy mass with carbon in a second furnace and thereby fully reducing the iron and causing it to coalesce and precipitate in the fused condition from the slag.

4. The process of reducing iron from its ores or other iron bearing substances, consisting in partially reducing the iron bearing substance in a furnace in the presence of carbon and feldspar and dissolving the partially reduced substance in the molten slag, thereby forming a spongy mass, and in a second furnace heating the spongy mass with carbon and thereby fully reducing the iron and causing it to coalesce and precipitate in the fused condition from the slag.

5. The process of reducing metal bearing substances, consisting in partially reducing the metal bearing substance in a furnace in the presence of a flux and insufficient carbon to complete the reduction and thereby partially reducing the metal and dissolving it in molten slag and forming a carbon free mass with the partially reduced metal distributed therein, and heating said mass in a carbon surfaced container and thereby reducing the metal and causing it to coalesce and precipitate in the fused condition from the slag.

6. The process of reducing metal bearing substances, consisting in heating the substance with feldspar and bauxite and insufficient carbon to complete the reduction and thereby partially reducing the metal and dissolving it in molten slag and forming a carbon free mass with the partially reduced metal distributed therein, and heating said mass in a carbon surfaced container and thereby fully reducing it and causing the metal to coalesce and precipitate in the fused condition from the slag.

In testimony whereof, I have hereunto set my hand.

GEORGE L. FOGLER.

Witnesses:
F. W. WINTER,
WILLIAM B. WHARTON.